Feb. 20, 1962  E. A. PECKER  3,021,911
WEIGHING APPARATUS
Filed May 6, 1960
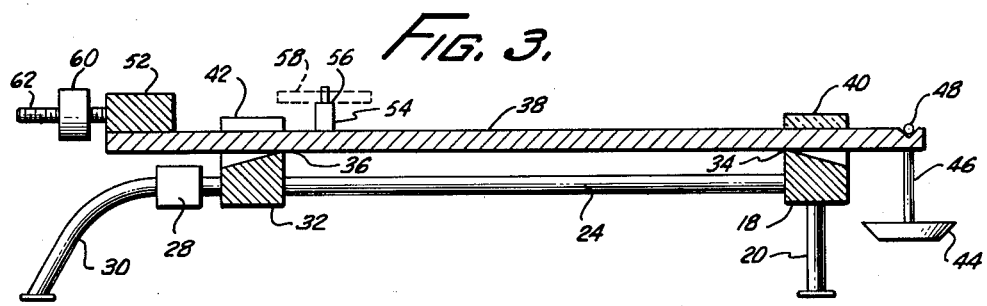
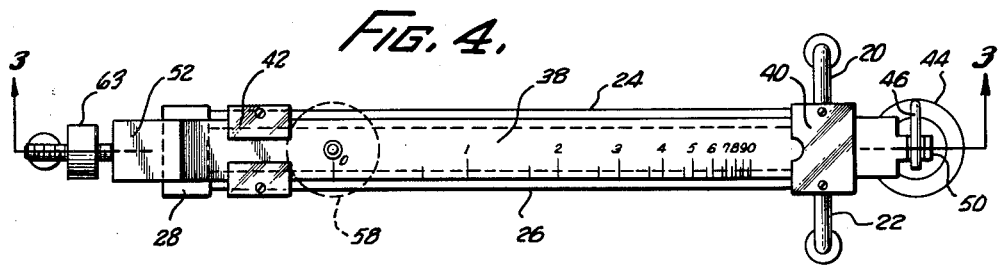
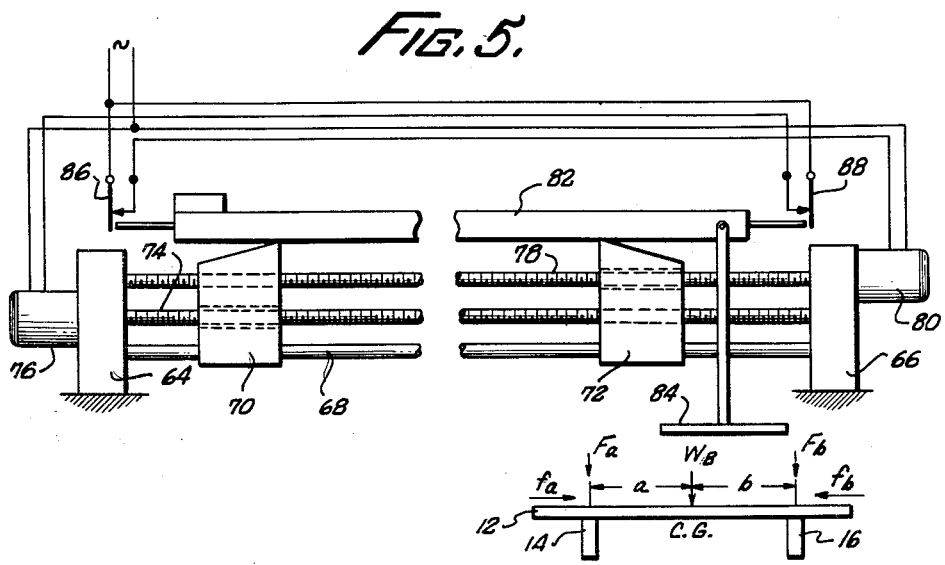
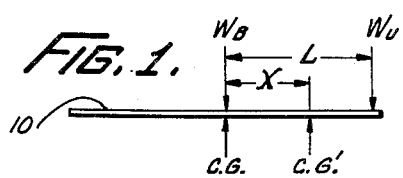
INVENTOR.
EDWIN A. PECKER
BY
Christie, Parker & Hale
ATTORNEYS.

United States Patent Office 3,021,911
Patented Feb. 20, 1962

3,021,911
WEIGHING APPARATUS
Edwin A. Pecker, Los Angeles, Calif.
(P.O. Box 1965, Lausanne 1, Switzerland)
Filed May 6, 1960, Ser. No. 27,338
10 Claims. (Cl. 177—251)

This invention relates to apparatus for making weight measurements and, more particularly, is concerned with a mechanical weighing device without springs.

Weighing devices generally may be classified as two types: a balance involving a pivoted beam in which known weights are balanced against unknown weights, or spring devices in which the unknown weight is balanced against the modulus of the spring. To achieve any accuracy, the balance-type weighing apparatus involves expensive low friction accurately machined pivots. The accuracy is subject to wear, dirt and minor damage to the support surfaces. Spring devices, on the other hand, are subject to variations in the modulus of the spring, its deflection with a given amount of weight varying with temperature, aging and the like.

The present invention provides a weighing device which operates on an entirely different principle than has heretofore been employed. The weighing device of the present invention involves no springs or accurately formed pivots. It is not subject to change in calibration or accuracy due to aging effects such as wear or changes in the characteristics of the materials used. The weighing device of the present invention may be of simple construction and at the same time is rugged and foolproof. It can be easily and quickly modified to accurately measure weights over an extended range. It may be designed to accommodate extremely large weights without any material modification in the overall design. Moreover, the sensitivity of the weighing apparatus of the present invention is inherently greatest at the lowest weight.

In brief, the present invention includes, in its simplest form, a horizontally disposed beam having the object to be weighed supported adjacent one end. The beam freely rests on a pair of supporting parallel edges which are horizontally movable in relation to each other so that the spacing between the supporting edges can be reduced to substantially zero by moving the edges toward each other. The weight of the object is measured by moving the two supports together and providing an indication of the distance from the point of the beam where the two supports come together and the point where the center of gravity of the unloaded beam is positioned. This distance can be directly translated into units of weight, so that a calibrated scale in units of weight may be marked off on the beam, with the zero point on the scale corresponding to the position of the center of gravity of the beam.

For a more complete understanding of the invention, reference should be had to the accompanying drawings, wherein:

FIGS. 1 and 2 are schematic force diagrams used in explaining the principles of the invention;

FIG. 3 is a side elevational view in section showing one embodiment of the present invention;

FIG. 4 is a top view of the same embodiment of the invention; and

FIG. 5 is a schematic showing of a modification of the invention.

The present invention operates on two principles. The first principle is that the addition of a weight to a beam at any point other than its center of gravity changes the center of gravity of the system to a new position. The amount of shift in the center of gravity is a direct measure of the weight added to the system at a predetermined point. This principle is illustrated by the diagram of FIG. 1, in which the numeral 10 indicates a simple beam whose weight $W_B$ may be considered as being concentrated at the center of gravity of the beam. Now if an unknown weight $W_U$ is applied at some known distance L from the center of gravity of the beam, the center of gravity of the resulting system is shifted by a distance $x$. Since the moments around the new center of gravity are zero, if the system is in equilibrium, the relation of the shift to the added weight can be expressed as follows:

$$W_U = \frac{W_B \cdot x}{L-x} \quad (1)$$

From the above expression, it will be seen that if the weight of the beam is known and the distances L and $x$ are known, the unknown weight may be determined. According to the weighing device of the present invention, the distance L is fixed, and a novel arrangement is provided for directly determining the value of $x$, from which a determination of the value of $W_U$ may be ascertained.

The manner of locating the center of gravity of a system according to the present invention involves the second principle on which the invention is based. The second principle is that two support points for a substantially horizontal beam, starting from positions on either side of the center of gravity of the beam, when moved toward one another always tend to keep the center of gravity between them. The point at which the two supports meet when moved toward each other always occurs directly below the center of gravity of the beam. Consider a beam 12, as shown in FIG. 2, resting on two supports 14 and 16. Again the weight of the beam $W_B$ is considered as concentrated at the center of gravity of the beam. Then the normal force on the support 14, considering the sum of the moments around the support 16 as being equal to zero, becomes:

$$F_a = \frac{b}{a+b} W_B \quad (2)$$

where $a$ is the distance from the support 14 to the center of gravity and $b$ is the distance from the support 16 to the center of gravity of the beam. Similarly, the normal force $F_b$ may be expressed as:

$$F_b = \frac{a}{a+b} W_B \quad (3)$$

If the supports 14 and 16 are moved towards each other, the horizontal force $f_a$ applied to the beam 12 may be expressed:

$$f_a = \mu_a F_a = \frac{b}{a+b} \mu_a W_B \quad (4)$$

where $\mu_a$ is the coefficient of friction of the support 14. Similarly, the opposing horizontal force applied to the beam 12 by the moving support 16 may be expressed:

$$f_b = \mu_b F_b = \frac{a}{a+b} \mu_b W_B \quad (5)$$

Thus, no matter what the values of $\mu_a$ and $\mu_b$, as $b$ goes to zero, the horizontal force $f_a$ must go to zero and likewise, as $a$ goes to zero, the horizontal force $f_b$ must go to zero. No force can be developed to move the center of gravity past either one of the supports, and consequently the center of gravity remains between the supports. In this way, the center of gravity can be accurately located by moving the supports together, since the center of gravity must lie directly above the point where the supports meet. This principle provides the basis in the present invention for locating the new center of gravity of a beam system when an unknown weight has been added.

Referring to FIGS. 3 and 4, one embodiment of the invention utilizing the above principles in weighing an unknown object is shown in detail. The weighing device includes a fixed support 18 to which are secured a pair of supporting legs 20 and 22. A pair of parallel guide rods 24 and 26 are secured at one end to the member 18 and extend to a supporting end block 28. A third leg 30, secured to the end block 28, provides, in conjunction with the legs 20 and 22, a tripod support by which the guide rods 24 and 26 are held in a horizontally disposed position.

A movable support member 32 slidably engages the guide rods 24 and 26 and is movable therealong between the fixed support member 18 and the end member 28. Both of the support members are beveled slightly on their upper surfaces to form well defined support ridges or edges, as indicated respectively at 34 and 36, these ridges falling adjacent each other when movable support member 32 is moved against the fixed support member 18.

Resting on the ridges 34 and 36 of the support members 18 and 32 is a horizontally disposed beam 38. The beam is constrained against lateral displacement by guide portions extending upwardly on either side of the beam and preferably integrally formed with the support members 18 and 32. A transparent plate 40 extends across the top of the beam between the guide portions of the fixed support member 18. Two plates 42 and 43 are secured to the guide portions of the movable support member 32. These top plates constrain against upward vertical movement of the beam off the supports.

An unknown weight is applied to the righthand end of the beam 38 by means of a weight pan 44 which is provided with a support 46 pivoted in a notch 48 formed in a narrow projecting portion 50 at one end of the beam 38. Thus the unknown weight is always applied to a fixed point along the extent of the beam.

It may be desirable to shift the center of gravity of the beam system to the left of center so as to leave a greater distance for the center of gravity to be shifted by the addition of an unknown weight to the weighing pan 44. To this end, a fixed weight 52 may be secured to the lefthand end of the beam 38.

A pin 54 is preferably secured to the beam at a point corresponding to the center of gravity of the beam system. The upper end of the pin 54 is of reduced diameter to provide a shoulder 56. Known weights, such as indicated by the dotted line 58, may be set on the pin 54 so as to increase the weight of the beam system without shifting its center of gravity. A scale is provided on the upper surface of the beam 38 running along one edge with the zero mark being positioned at the center of gravity of the beam system. An adjustable weight 60 is threaded on a supporting pin 62 extending from one end of the beam 38. The turning of the weight 60 moves it horizontally along a threaded pin 62, thus providing a fine adjustment by which the center of gravity of the beam system can be adjusted so that it corresponds exactly with the zero index mark on the scale.

In operation, the movable support 32 is first moved over against the end member 28 so as to provide the widest possible spacing between the supports 18 and 32. At the same time, the upper plates 42 and 43 of the movable support 32 engage the fixed weight 52, pushing the beam 38 to the left. The unknown weight is then added to the weighing pan 44. The support 32 is moved to the right until it is moved into engagement with the fixed support 18. The unknown weight is then determined directly from the graduation on the scale which is aligned with the interface between the engaged support members 18 and 32. The scale can be calibrated to read directly in units of weight, such as ounces, pounds or the like.

In order to change the range of the weighing scale, weights, such as the weight 58, of some multiple of the weight of the beam system may be used. The scale factor is multiplied by the ratio of the added weight 58 to the weight of the beam system. For example, if the initial beam assembly graduations are calibrated for ounce measurements, and the added weight is fifteen times the weight of the beam assembly, the new total beam weight is sixteen times the original, and the graduations now indicate pounds instead of ounces.

The calibration marks on the scale are determined by the distance between the zero point and the pivot point. For example, a graduation mark exactly midway between these points indicates the point to which the center of gravity is shifted by a weight which is exactly equal to the unloaded weight of the beam system. If the beam assembly is manufactured to weigh one pound with its center of gravity adjusted to the zero point, this graduation mark serves to indicate one pound of added weight. Other graduation marks are similarly located.

It will be noted that the sensitivity of the balance, that is, the amount of motion of the center of gravity due to an incremental added weight, is greatest at the lowest weight. Thus the spacing between the graduations decreases as the distance from the center of gravity increases.

The embodiment of the invention particularly described in connection with the FIGURES 3 and 4 may be modified in a number of ways which will be obvious to one skilled in the art. For example, the movable support may be motor driven to provide an automatic weighing device, and it will be understood that either one or both of the supports may be movable. Such a modified arrangement is shown in FIG. 5. By moving both supports, the longitudinal position of the beam may be held relatively fixed, which may be an advantage in some weighing situations.

In the arrangement of FIG. 5, the frame of the machine includes two end plates 64 and 66 having a guide member 68 extending therebetween. Movably supported on the guide member 68 are a pair of movable support members 70 and 72. Support member 70 is moved along the guide member 68 by a feed screw 74 driven by a motor 76. Similarly, the support member 72 is driven by a screw feed 78 rotated by drive motor 80. A weighing beam 82 is freely supported between the two support members 70 and 72. A weighing pan 84 is supported from one end of the beam 82. A pair of normally closed switches indicated at 86 and 88 are respectively positioned at either end of the beam 82. A slight longitudinal displacement of the beam 82 in either direction opens one or the other of the associated switches 86 and 88. Switch 86 is connected between a source of electrical power and the drive motor 80, while the switch 88 is connected between the electrical power source and the motor 76.

During the weighing operation, power is applied through the two switches to the motors 76 and 80, causing simultaneous movement of the two supports 70 and 72 toward each other. This will tend to displace the beam 82 in one direction or the other, resulting in one of the switches being opened and the associated drive motor being stopped. This will prevent further displacement of the beam 82 in the direction of the now open switch. It will be seen that by this arrangement, the beam 82 is maintained in relatively fixed position, one or the other of the movable supports 70 and 72 being moved until they come together at the center of gravity of the beam system plus the unknown weight.

The arrangement of FIG. 5 has the advantage that the position of the unknown weight and the associated weighing beam remains relatively fixed throughout the weighing operation.

From the above description, it will be recognized that a unique weighing device is provided which gives a direct measure of weight without the use of springs or balancing of weight on pivots. The invention provides an improved weighing device which is easy to operate, simple

What is claimed is:

1. A weighing apparatus comprising a frame including a horizontal guide member, a first support fixedly mounted on the frame adjacent one end of the horizontal guide member, a second support mounted on the horizontal guide member and movable therealong, the first and second supports providing a pair of spaced parallel ridges located in a common horizontal plane, an elongated beam having a smooth horizontal under surface resting on the ridges of the first and second supports with the ridges extending transversely to the longitudinal axis of the beam, guide means associated with the supports for constraining the beam against lateral and vertical movement but permitting free movement of the beam along its longitudinal axis, means for applying the weight of an object to be weighed to the end of the beam nearest the fixed support, a fixed weight secured to the beam adjacent the opposite end of the beam for shifting the center of gravity of the beam away from the fixed support, means positioned at the center of gravity of the beam and fixed weight assembly for receiving additional weights, whereby known weights can be applied at the center of gravity of the beam, and a graduated scale along the length of the beam extending from the center of gravity in the direction toward the end of the beam where the object of unknown weight is applied, the scale being calibrated in units of weight with zero on the scale being located at the center of gravity of the beam assembly.

2. A weighing apparatus comprising a frame including a horizontal guide member, a first support fixedly mounted on the frame adjacent one end of the horizontal guide member, a second support mounted on the horizontal guide member and movable therealong, the first and second supports providing a pair of spaced parallel ridges located in a common horizontal plane, an elongated beam having a smooth horizontal under surface resting on the ridges of the first and second supports with the ridges extending transversely to the longitudinal axis of the beam, guide means associated with the supports for constraining the beam against lateral and vertical movement but permitting free movement of the beam along its longitudinal axis, means for applying the weight of an object to be weighed to the end of the beam nearest the fixed support, a fixed weight secured to the beam adjacent the opposite end of the beam for shifting the center of gravity of the beam away from the fixed support, means positioned at the center of gravity of the beam and fixed weight assembly for receiving additional weights, whereby known weights can be applied at the center of gravity of the beam, and means for indicating the distance between the position of the center of gravity of the beam assembly and the ridge of the fixed support when the movable support is moved against the fixed support.

3. A weighing apparatus comprising a frame including a horizontal guide member, a first support fixedly mounted on the frame adjacent one end of the horizontal guide member, a second support mounted on the horizontal guide member and movable therealong, the first and second supports providing a pair of spaced parallel ridges located in a common horizontal plane, an elongated beam having a smooth horizontal under surface resting on the ridges of the first and second supports with the ridges extending transversely to the longitudinal axis of the beam, guide means associated with the supports for constraining the beam against lateral and vertical movement but permitting free movement of the beam along its longitudinal axis, means for applying the weight of an object to be weighed to the end of the beam nearest the fixed support, means positioned at the center of gravity of the beam for receiving additional weights, whereby known weights can be applied at the center of gravity of the beam, and means for indicating the distance between the position of the center of gravity of the beam and the ridge of the fixed support when the movable support is moved against the fixed support.

4. A weighing apparatus comprising a frame including a horizontal guide member, a first support fixedly mounted on the frame adjacent one end of the horizontal guide member, a second support mounted on the horizontal guide member and movable therealong, the first and second supports providing a pair of spaced parallel ridges located in a common horizontal plane, an elongated beam having a smooth horizontal under surface resting on the ridges of the first and second supports with the ridges extending transversely to the longitudinal axis of the beam, means for applying the weight of an object to be weighed to the end of the beam nearest the fixed support, means positioned at the center of gravity of the beam for receiving additional weights, whereby known weights can be applied at the center of gravity of the beam, and means for indicating the distance between the position of the center of gravity of the beam and the ridge of the fixed support when the movable support is moved against the fixed support.

5. A weighing apparatus comprising a frame including a horizontal guide member, a first support fixedly mounted on the frame adjacent one end of the horizontal guide member, a second support mounted on the horizontal guide member and movable therealong, the first and second supports providing a pair of spaced parallel ridges located in a common horizontal plane, an elongated beam having a smooth horizontal under surface resting on the ridges of the first and second supports with the ridges extending transversely to the longitudinal axis of the beam, means for applying the weight of an object to be weighed to the end of the beam nearest the fixed support, and means for indicating the distance between the position of the center of gravity of the beam and the ridge of the fixed support when the movable support is moved against the fixed support.

6. Apparatus for measuring the weight of an object comprising a horizontally disposed beam having the object to be weighed supported adjacent one end, means providing a pair of spaced supports on which the beam freely rests, the supports being horizontally movable relative to each other, whereby the spacing between the supports can be reduced to substantially zero by moving the supports toward each other, and means for indicating the distance between the position along the beam where the supports meet when moved together and the position along the beam of its center of gravity without the object present.

7. A weighing device comprising a horizontal frame, a pair of beam support members mounted on the frame, the support members being relatively movable toward each other along the horizontal frame, a beam resting on the two support members in a horizontal position, means for supporting the object to be weighed adjacent one end of the beam, and means for indicating the distance between the point of the center of gravity of the beam without the object to be weighed and the point on the beam where the two support members come together when they are moved toward each other with the object to be weighed added to the supporting means, this distance being a measure of the weight of the object.

8. Apparatus as defined in claim 7 wherein one of the supports is fixed with respect to the frame and the other support is movable.

9. Apparatus as defined in claim 7 wherein both supports are movable with respect to the frame.

10. Apparatus as defined in claim 9 further including motor means for respectively moving each of the supports, means for sensing longitudinal displacement of the beam in either direction, and motor control means responsive to the sensing means for maintaining the beam in relatively fixed position while actuating the motor means to drive the supports toward each other.

No references cited.